US008610394B2

(12) United States Patent
Araki

(10) Patent No.: US 8,610,394 B2
(45) Date of Patent: Dec. 17, 2013

(54) MICROCOMPUTER FOR CONTROLLING ULTRASONIC MOTOR, AND METHOD FOR CONTROLLING ULTRASONIC MOTOR

(75) Inventor: Kentarou Araki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 13/551,390

(22) Filed: Jul. 17, 2012

(65) Prior Publication Data

US 2012/0306430 A1 Dec. 6, 2012

Related U.S. Application Data

(63) Continuation of application No. 12/457,897, filed on Jun. 24, 2009, now Pat. No. 8,253,370.

(30) Foreign Application Priority Data

Jun. 25, 2008 (JP) ................................ 2008-166165

(51) Int. Cl.
*H02P 23/00* (2006.01)

(52) U.S. Cl.
USPC .................. 318/799; 318/400.11; 318/400.13

(58) Field of Classification Search
USPC .................. 318/799, 400.11, 400.13, 400.32, 318/400.38, 721, 432, 701, 400.39, 400.4, 318/400.01
See application file for complete search history.

(56) References Cited

U.S. PATENT DOCUMENTS 7,085,484 B2 8/2006 Hara
2009/0140682 A1 6/2009 Watahiki
2010/0308760 A1* 12/2010 Nakamura .............. 318/400.11

FOREIGN PATENT DOCUMENTS

JP 2001-246324 A 9/2001
JP 2003-153558 A 5/2003
JP 2004-056878 A 2/2004
JP 2006-238564 A 9/2006
JP 2008-079395 A 4/2008

OTHER PUBLICATIONS

Japanese Office Action dated Oct. 9, 2012 with an English translation.

* cited by examiner

*Primary Examiner* — Karen Masih
(74) *Attorney, Agent, or Firm* — McGinn IP Law Group, PLLC

(57) ABSTRACT

A microcomputer that outputs a pulse signal controlling an ultrasonic motor includes a digital/analog, D/A, conversion set register that stores a D/A conversion set value setting an amplitude value of the pulse signal, a D/A converter that generates the amplitude value based on the D/A conversion set value, a first compare register that stores a first compare register value setting a frequency of the pulse signal, a second compare register that stores a second compare register value setting a duty ratio of the pulse signal, a counter that outputs a count value, a first comparator that compares the first compare register value with the count value to generate a first comparison result signal, and a second comparator that compares the second compare register value with the count value to generate a second comparison result signal.

8 Claims, 7 Drawing Sheets

MICROCOMPUTER
1
18: INTERNAL BUS
CPU
11
FLASH MEMORY
12
RAM
13
D/A CONVERTING UNIT
141
TIMER
151
D/A CONVERTING UNIT
142
TIMER
152
UP-DOWN COUNTER
17
OUTPUT CIRCUIT
161
OUTPUT CIRCUIT
162
TRANSFORMER
2
ULTRASONIC MOTOR
3
ENCODER
4
POWER SUPPLY (VDD)

Fig. 3
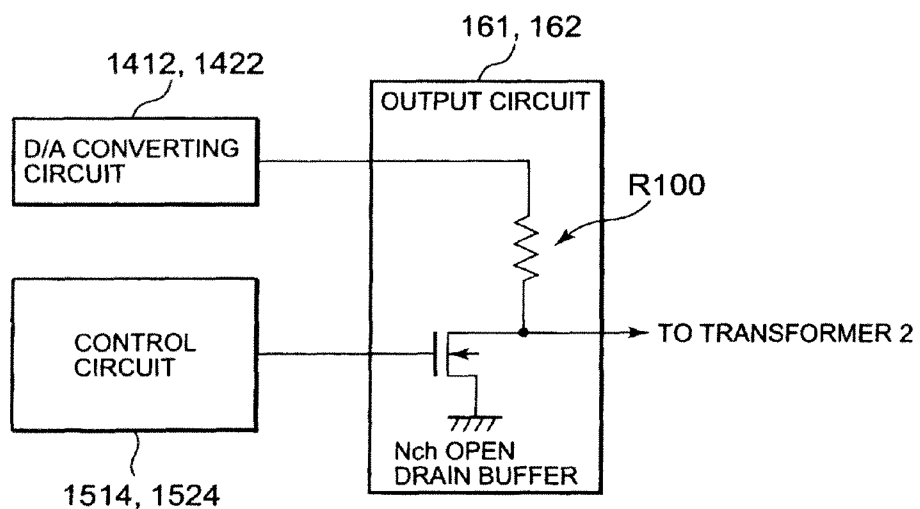
Fig. 4A
Fig. 4B
Fig. 4C
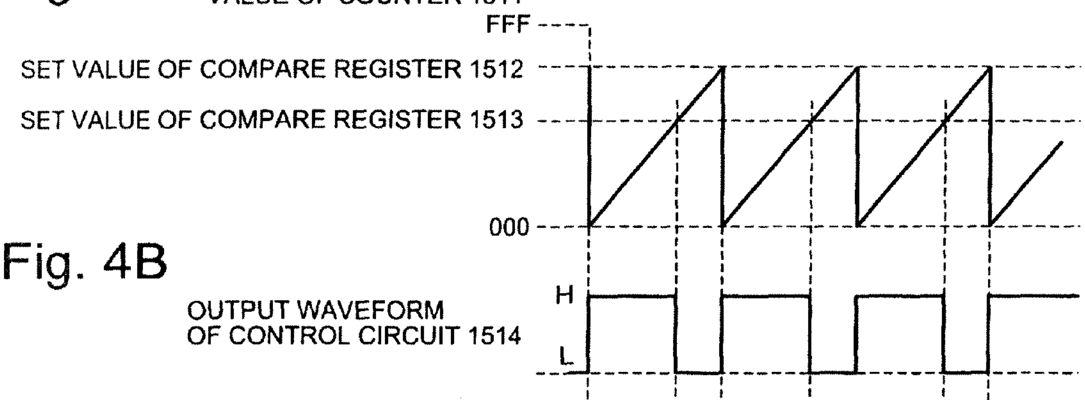

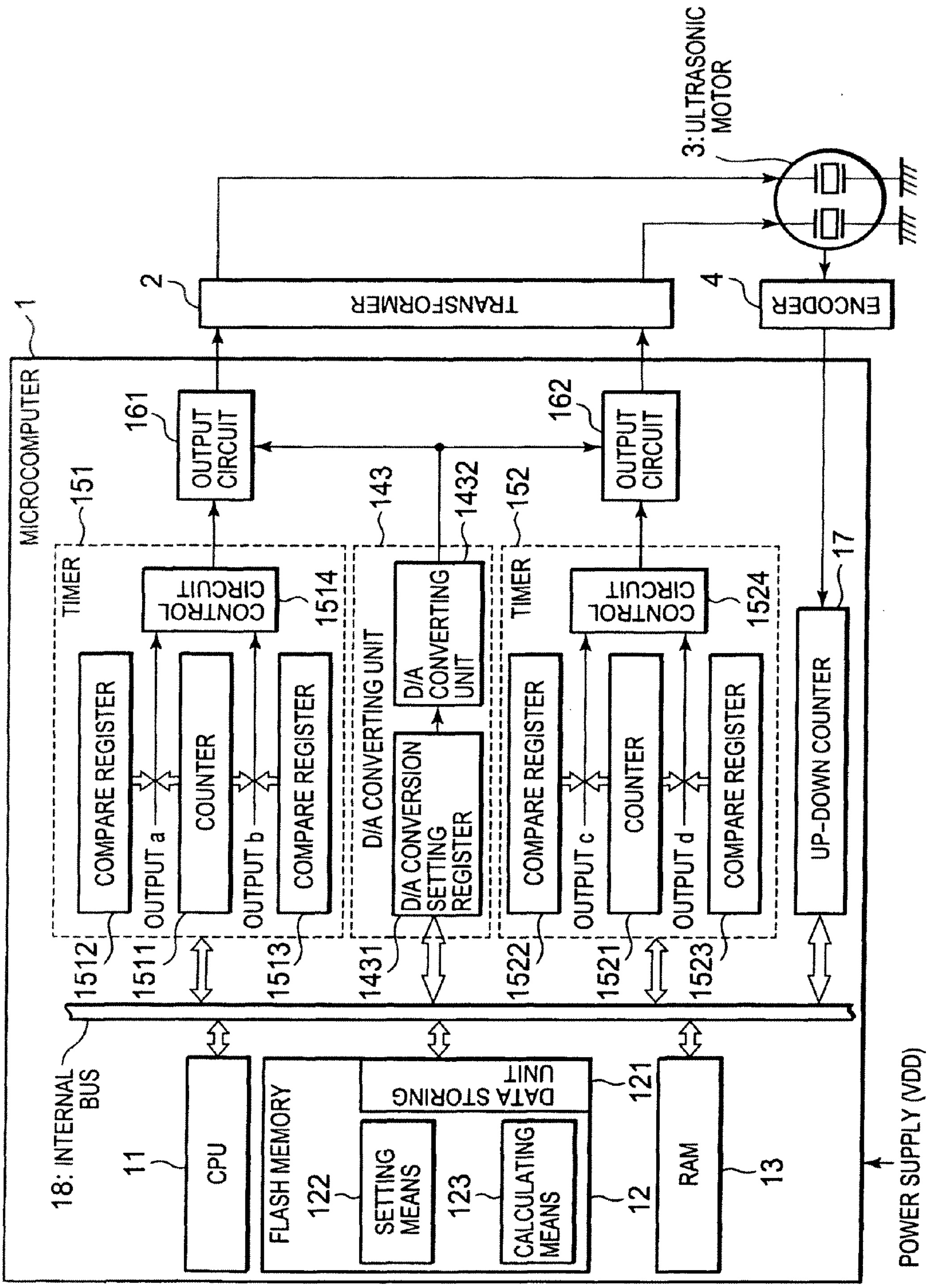

Fig. 8
MICROCOMPUTER
1
2
TRANSFORMER
3: ULTRASONIC MOTOR
4
ENCODER
161
OUTPUT CIRCUIT
162
OUTPUT CIRCUIT
151
TIMER
CONTROL CIRCUIT
1514
COMPARE REGISTER
OUTPUT a
COUNTER
OUTPUT b
COMPARE REGISTER
143
D/A CONVERTING UNIT
1432
D/A CONVERTING UNIT
D/A CONVERSION SETTING REGISTER
152
TIMER
CONTROL CIRCUIT
1524
COMPARE REGISTER
OUTPUT c
COUNTER
OUTPUT d
COMPARE REGISTER
17
UP-DOWN COUNTER
1512
1511
1513
1431
1522
1521
1523
18: INTERNAL BUS
11
CPU
FLASH MEMORY
DATA STORING UNIT
121
122
SETTING MEANS
123
CALCULATING MEANS
12
RAM
13
POWER SUPPLY (VDD)

MICROCOMPUTER FOR CONTROLLING ULTRASONIC MOTOR, AND METHOD FOR CONTROLLING ULTRASONIC MOTOR

INCORPORATION BY REFERENCE

The present application is a Continuation Application of U.S. patent application Ser. No. 12/457,897, filed on Jun. 24, 2009 now U.S. Pat. No. 8,253,370, which is based upon and claims the benefit of priority from Japanese Patent Application No. 2008-166165 which was filed on Jun. 25, 2008, the disclosure of which is incorporated herein in its entirety by reference.

BACKGROUND OF THE INVENTION

1. Field of the Invention

The present invention relates to a microcomputer for controlling an ultrasonic motor and to a method for controlling the ultrasonic motor.

2. Description of Related Art

There is a known ultrasonic motor having a stator that has a piezoelectric body and a moving body that performs rotational movement. In the ultrasonic motor, a traveling wave is generated on a stator which is in turn excited by applying a control signal having a frequency in an ultrasonic frequency band (20 kHz or higher), to the piezoelectric body. The ultrasonic motor transmits mechanical energy generated by elliptic movement that occurs at respective points on the excited stator to the moving body to rotate the moving body so as to produce power.

The ultrasonic motor controls the rotation speed of the moving body by using the frequency of the control signal applied to the piezoelectric body. However, ultrasonic motors largely vary from one another in their characteristics. Accordingly, the rotation speed obtained at a particular frequency varies among the ultrasonic motors, and the ultrasonic motors, therefore, need to be controlled individually. The technique shown below is disclosed as a technique controlling the ultrasonic motor.

JP-A-2003-153558 discloses an oscillatory wave motor drive control device that applies an alternative sine wave with low distortion to the piezoelectric body so that partial wear-and-tear (i.e., damage) less likely to occur on the stator, and an oscillatory wave motor having a longer service life can be realized. The oscillatory wave motor drive control device of JP-A-2003-153558 is a drive control device for an oscillatory wave motor that excites an electro-mechanical energy conversion element to obtain a driving force by applying a frequency signal to the electro-mechanical energy conversion element, which includes: an encoder for detecting a working speed of the oscillatory wave motor; a speed difference detecting unit for outputting a speed difference signal by calculating a speed difference between the working speed detected by the encoder and a target speed of the oscillatory wave motor; a frequency setting unit for setting a frequency increase/decrease amount based on the speed difference signal; a reference voltage unit for generating a reference voltage corresponding to the target speed; a voltage detecting unit for detecting a voltage of the frequency signal applied to the oscillatory wave motor; a comparing unit for outputting a voltage difference signal by comparing the reference voltage generated by the reference voltage unit and the voltage detected by the voltage detecting unit; a sine wave transmitting unit for transmitting a sine wave signal whose frequency is obtained by calculating the frequency corresponding to the target speed and finely adjusting the frequency based on the frequency increase/decrease amount set by the frequency setting unit and whose amplitude is determined based on the voltage difference signal output from the comparing unit; a driving signal generator for generating a plurality of sine wave driving signals of different phases based on the sine wave signal output from the sine wave transmitting unit; and a motor driving circuit for applying periodic signals to the oscillatory wave motor based on the plurality of sine wave driving signals output from the driving signal generator.

SUMMARY

However, the present inventor has recognized the following point. Namely, the oscillatory wave motor drive control device of JP-A-2003-153558 intends to optimize the characteristics of the ultrasonic motor (i.e., oscillator motor) by controlling the frequency and amplitude of a frequency signal to be input to the motor. Since the oscillatory wave motor drive control device of JP-A-2003-153558 is formed by many fixed circuits, however, it has low accuracy in the control due to variation in the characteristics of the individual circuits.

An exemplary feature of the present invention is to provide an ultrasonic motor control device that is capable of adjusting the characteristics in a wider scope.

The present invention seeks to solve one or more of the above problems, or to improve upon those problems at least in part.

In one exemplary embodiment, a microcomputer that controls an ultrasonic motor includes a storage unit that stores a compare register value, and a digital/analog (D/A) conversion set value, a D/A converter that generates an amplitude control signal with an amplitude value corresponding to the D/A conversion set value, a timer that generates a pulse width modulation (PWM) signal with a frequency corresponding to the compare register value, a central processing unit (CPU) that reads the D/A conversion set value, and the compare register value from the storage unit, and that sets the D/A conversion set value and the compare register value to the D/A converter and the timer, respectively, and an output circuit that generates the control signal with the amplitude of the amplitude control signal, and the frequency of the PWM signal, in response to the amplitude control signal and the PWM signal. The compare register value is provided for determining a frequency of the control signal corresponding to a target rotation speed that is targeted by the ultrasonic motor. The D/A conversion set value is provided for determining an amplitude of the control signal corresponding to the target rotation speed that is targeted by the ultrasonic motor.

In another exemplary embodiment, a microcomputer that controls an ultrasonic motor includes a storage unit that stores a compare register value, and a digital/analog (D/A) conversion set value, a D/A converter that generates a amplitude control signal with an amplitude value corresponding to the D/A conversion set value, a timer that generates a pulse width modulation (PWM) signal with a frequency corresponding to the compare register value, a setting unit that reads the D/A conversion set value, and the compare register value from the storage unit, and that sets the D/A conversion set value and the compare register value to the D/A converter and the timer, respectively, and an output circuit that generates the control signal with the amplitude of the amplitude control signal, and the frequency of the PWM signal, in response to the amplitude control signal and the PWM signal. The compare register value is provided for determining a frequency of the control signal corresponding to a target rotation speed that is targeted by the ultrasonic motor. The D/A conversion set value is provided for determining an amplitude of the control signal corresponding to the target rotation speed that is targeted by the ultrasonic motor.

In yet another exemplary embodiment, a method that is provided for controlling an ultrasonic motor by using a microcomputer includes providing a digital/analog (D/A) conversion set value for determining an amplitude of a control signal corresponding to a target rotation speed that is targeted by the ultrasonic or, providing a compare register value for determining a frequency of the control signal corresponding to a target rotation speed that is targeted by the ultrasonic motor, generating an amplitude control signal with an amplitude value corresponding to the D/A conversion set value, generating a pulse width modulation (PWM) signal with a frequency corresponding to the compare register value, and generating the control signal with the amplitude value of the amplitude control signal, and the frequency of the PWM signal, in response to the amplitude control signal and the PWM signal.

As mentioned above, an exemplary feature of the present invention is to provide an ultrasonic motor control device that is capable of adjusting the characteristics in a wider scope.

BRIEF DESCRIPTION OF THE DRAWINGS

The above and other purposes, advantages and features of the present invention will become more apparent from the following description of certain exemplary embodiments taken in conjunction with the accompanying drawings in which:

FIG. 3 is a diagram showing an example of the configuration of an output circuit 161;

FIG. 4A is a timing chart showing an example of an operation of a timer 151;

FIG. 4B is a timing chart showing an example of an operation of a timer 151;

FIG. 4C is a timing chart showing an example of an operation of an output circuit 161;

FIG. 8 is a block diagram showing a configuration of the ultrasonic motor control device of a second exemplary embodiment.

DETAILED DESCRIPTION OF THE EXEMPLARY EMBODIMENTS

The invention will now be described herein with reference to illustrative exemplary embodiments. Those skilled in the art will recognize that many alternative embodiments can be accomplished using the knowledge of the present invention, and that the invention is not limited to the exemplary embodiments illustrated for explanatory purposes.

First Exemplar Embodiment

Description of the Configuration

Figure 1:
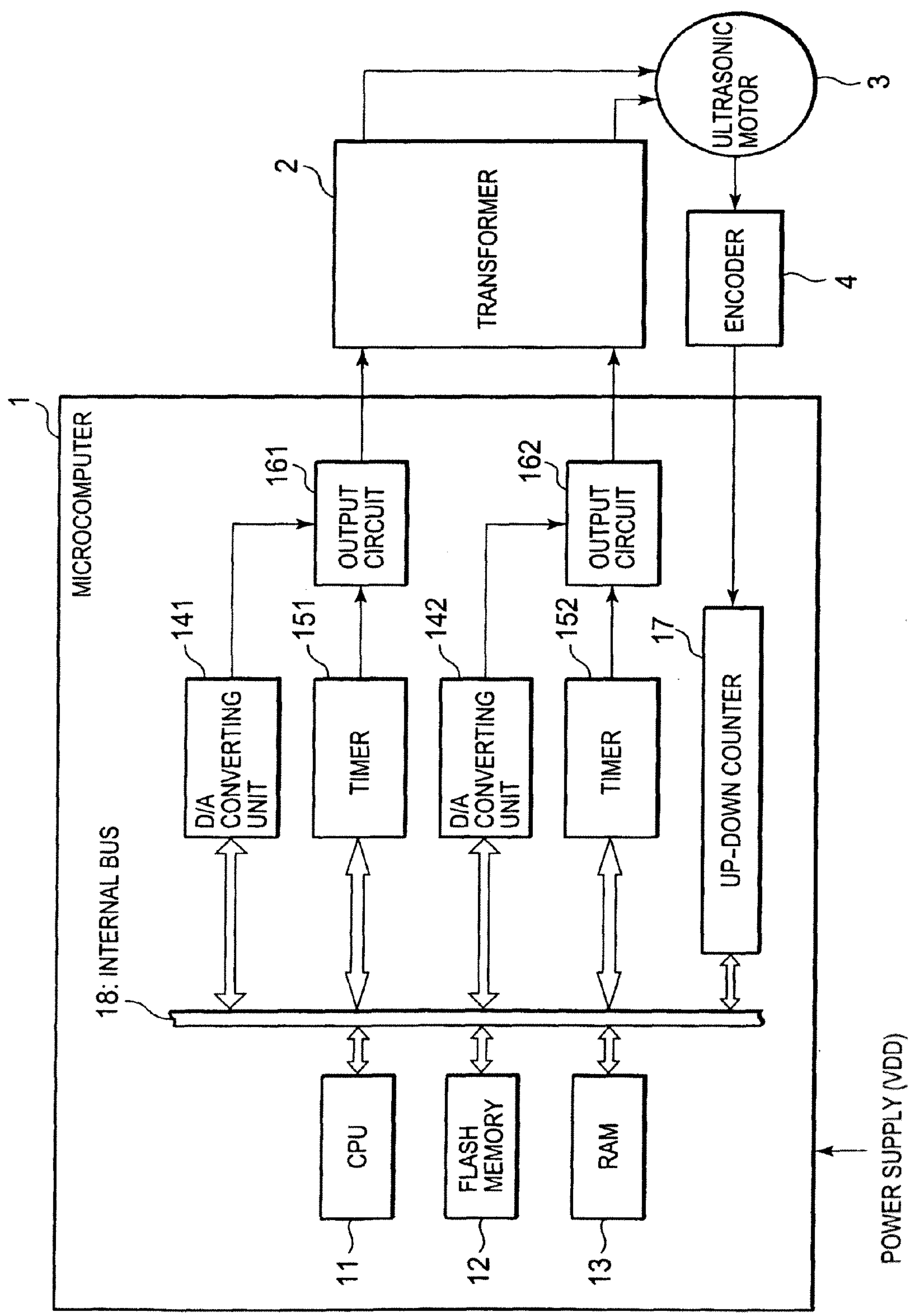
FIG. 1 is a block diagram showing the configuration of an ultrasonic motor control device of a first exemplary embodiment.

First, the configuration of the first exemplary embodiment will be described with reference to FIG. 1 to FIG. 6. FIG. 1 is a block diagram showing the configuration of the ultrasonic motor control device of the first exemplary embodiment. The ultrasonic motor control device of the first exemplary embodiment includes a microcomputer 1, a transformer 2, an ultrasonic motor 3, and an encoder 4.

First, the ultrasonic motor 3 will be described. The ultrasonic motor 3 has a stator that has a piezoelectric body to which a control signal is input and a moving body that performs rotational movement. The ultrasonic motor 3 excites the stator with a control signal that has been input to the piezoelectric body and transmits the mechanical energy of the stator to a rotor to rotate the rotor. Since the ultrasonic motor 3 is configured with the conventional art, detailed description thereof will be omitted. In the first exemplary embodiment, the ultrasonic motor 3 is controlled by using two-phase control signals having a phase difference of 90 degrees. For that reason, the ultrasonic motor 3 of the first exemplary embodiment has two stators, each of which has the piezoelectric body. The ultrasonic motor 3 receives the control signal from the transformer 2. Note that the control signal is not limited to being a two-phase control signal.

Next, the encoder 4 will be described. The encoder 4 detects the rotation direction at the present time (hereinafter, the "current rotation direction") and the rotation speed (rpm) at the present time (hereinafter, the "current rotation speed"). The encoder 4 encodes the current rotation direction and the current rotation speed of the ultrasonic motor 3. The encoder 4 outputs the encoded current rotation direction and current rotation speed to an up-down counter 17 of the microcomputer 1 (described later). Since the encoder 4 is configured with the conventional art, detailed description thereof will be omitted.

Next, the transformer 2 will be described. The transformer 2 boosts the voltage of the control signal input from the microcomputer 1. The transformer 2 outputs the control signal whose voltage has been boosted to the ultrasonic motor 3. Since the transformer 2 is configured with the conventional art, detailed description thereof will be omitted.

Figure 2:
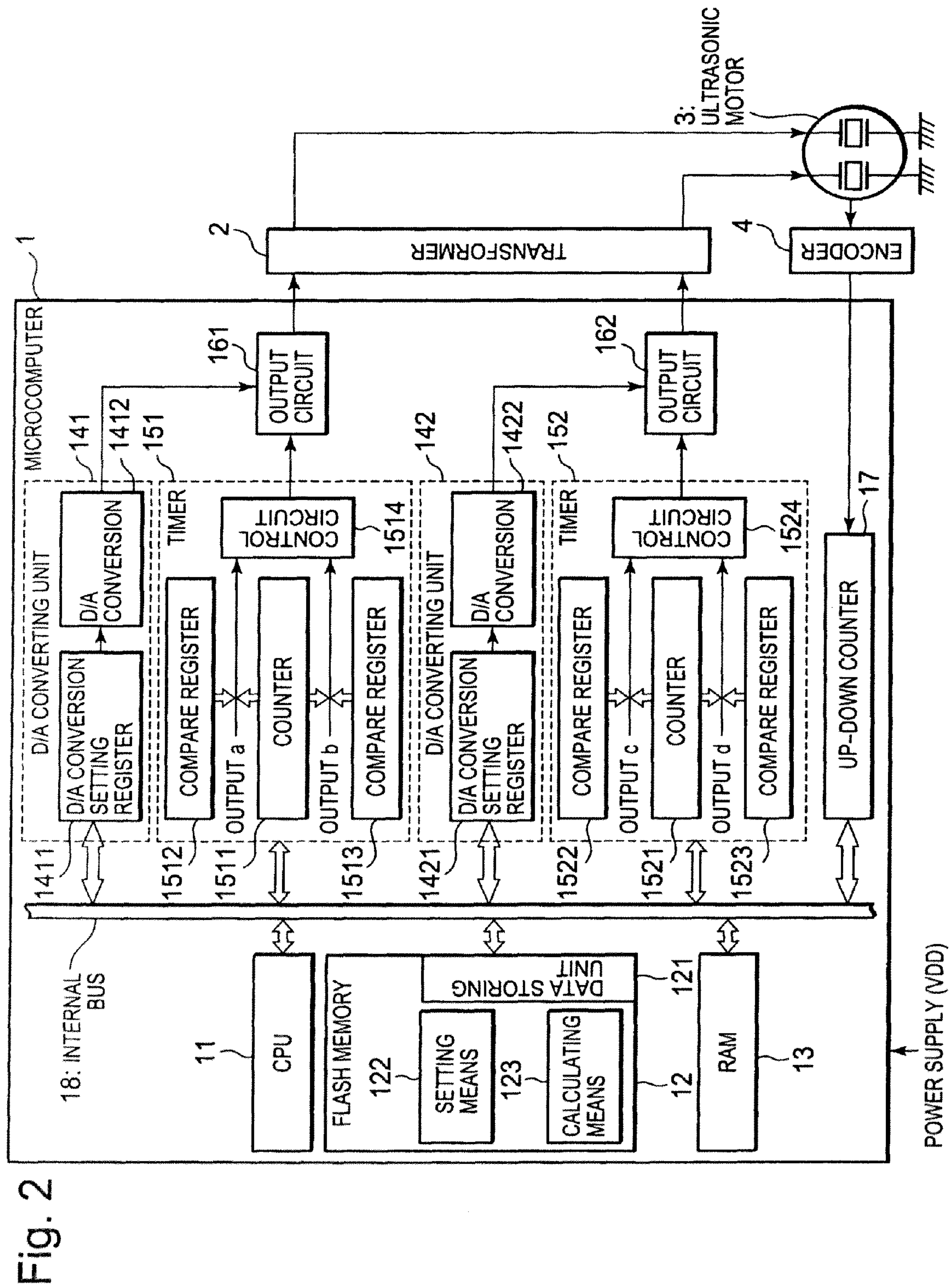
FIG. 2 is a block diagram showing a microcomputer 1 in further detail in the configuration of the ultrasonic motor control device of the first exemplary embodiment.

Next, the microcomputer 1 will be described. FIG. 2 is a block diagram showing the microcomputer 1 in further detail in the configuration of the ultrasonic motor control device of the first exemplary embodiment. The microcomputer 1 outputs the control signal for the ultrasonic motor 3. The microcomputer 1 receives a drive command from outside (not shown). The microcomputer 1 generates the control signal for the ultrasonic motor 3 based on the rotation direction targeted by the ultrasonic motor 3 (hereinafter, "target rotation direction") and the rotation speed targeted by the ultrasonic motor 3 (hereinafter, "target rotation speed") that are commanded by the drive command. The microcomputer 1 receives inputs of the encoded current rotation direction and current rotation speed from the encoder 4. The microcomputer 1 corrects the characteristics of the control signal based on differences between the current rotation direction and the target rotation direction and between the current rotation speed and the target rotation speed. The microcomputer 1 outputs the control signal to the transformer 2.

The microcomputer 1 has a central processing unit (CPU) 11; a flash memory 12; a random access memory (RAM) 13; digital/analog (D/A) converting units 141 and 142; timers 151 and 152; output circuits 161, 162; an up-down counter 17; and an internal bus 18. The CPU 11, the flash memory 12, the RAM 13, the D/A converting units 141 and 142, the timers 151 and 152, the output circuits 161, 162, and the up-down counter 17 are respectively connected with the internal bus 18 so that they can send and receive data via the internal bus 18. Each of the components is driven as the power supply (VDD) is input from outside. In the first exemplary embodiment, the microcomputer 1 has two sets of the D/A converting unit 141, the timer 151, and the output circuit 161. This is because the ultrasonic motor 3 has two sets of the piezoelectric body in the first exemplary embodiment, which requires two inputs of the control signals. If the ultrasonic motor 3 has four sets of the piezoelectric body, then four inputs of the control signals are required. In such a case, the microcomputer 1 has four sets the D/A converting unit 141, the timer 151, and the output circuit 161 with four outputs for the control signals. It should be noted that the microcomputer 1 has the D/A converting unit 141, the timer 151, and the output circuit 161 as many as that of the piezoelectric body sets in the ultrasonic motor 3 (i.e., the number of the inputs of the control signals).

First, the CPU 11 controls the microcomputer 1. The CPU 11 implements the functions of the microcomputer 1 by executing a control program that is stored in the flash memory 12.

Now, the flash memory 12 stores the control program and data for implementing the functions of the microcomputer 1. The flash memory may be a non-volatile memory such as a read only memory (ROM) or the like. The flash memory 12 has a data storing unit 121, setting means 122, and calculating means 123.

The data storing unit 121 stores a D/A conversion set value and a compare register value. The D/A conversion set value is data to be set to D/A conversion setting registers 1411 and 1412 in the D/A converting units 141 and 142 (described later). The D/A conversion set value is used for determining each amplitude value (voltage value) of amplitude control signals that are output from D/A conversions 1412, 1422. The compare register value is data to be set to compare registers 1512, 1513, 1522 and 1523 of the timers 151 and 152 (described later). The compare register value is used for determining output timing of each of low level signals to be output from the compare registers 1512 and 1522 and pulse width control signals to be output from the compare registers 1513 and 1523.

Each of the D/A conversion set value and the compare register value has a reference value (hereinafter, the "reference D/A conversion set value" and the "reference compare register value") and a correction value (hereinafter, the "correction D/A conversion set value" and the "correction compare register value"). Hereinafter, the expression "D/A conversion set value" includes the reference D/A conversion set value and the correction D/A conversion set value, and the expression "compare register value" includes the reference compare register value and the correction compare register value, unless described particularly.

The reference D/A conversion set value and the reference compare register value are determined based on the characteristics of the referential ultrasonic motor 3. The reference D/A conversion set value and the reference compare register value respectively indicate the frequency and the amplitude value of the control signal corresponding to the target rotation speed and the target rotation direction of the referential ultrasonic motor 3.

The reference D/A conversion set value and the reference compare register value are determined based on the characteristics of the referential ultrasonic motor 3 that are obtained from many kinds of statistical data. The reference D/A conversion set value and the reference compare register value are stored in the data storing unit 121 in advance in association with the target rotation speed and the target rotation direction and the frequency and the amplitude value that correspond to the target rotation speed and the target rotation direction, respectively.

On the other hand, the correction D/A conversion set value and the correction compare register value are correction values from the reference D/A conversion set value and the reference compare register value. The correction D/A conversion set value and the correction compare register value are calculated by the calculating means 123 in the case in which the current rotation speed and the current rotation direction that are the characteristics of the ultrasonic motor 3 do not match the target rotation speed and the target rotation direction when the ultrasonic motor 3 are driven with the reference D/A conversion set value and the reference compare register value. This means that the correction D/A conversion set value and the correction compare register value are the characteristics of the control signal corresponding to the target rotation speed and the target rotation direction of the ultrasonic motor 3. When the correction D/A conversion set value and the correction compare register value are calculated by the calculating means 123, they are stored in the data storing unit 121.

The setting means 122 sets the D/A conversion set values to the D/A conversion setting registers 1411, 1421. The setting means 122 may be a control program by the CPU 11. The set means 122 sets the compare register values to the compare registers 1512, 1513, 1522 and 1523. The setting means 122 determines the frequency to be set (hereinafter, "setting frequency") and the amplitude value to be set (hereinafter, "setting amplitude value") that are the characteristics of the control signal corresponding to the target rotation direction and the target rotation speed from the data storing unit 121 of the flash memory 12.

The setting means 122 obtains the D/A conversion set values corresponding to the setting amplitude values of the control signals from the data storage area 121 and sets them to the D/A conversion setting registers 1411, 1421. Also, the setting means 122 obtains the compare register values corresponding to the setting frequencies of the control signals from the data storage area 122 and sets them to the compare registers 1512, 1513, 1522 and 1523.

If the correction D/A conversion set value and the correction compare register value corresponding to the target rotation direction and the target rotation speed are stored in the data storing unit 121 when the setting means 122 is to obtain the D/A conversion set value and the compare register value from the data storing unit 121, then the setting means 122 obtains the correction D/A conversion set value and the correction compare register value. This is because the correction D/A conversion set value and the correction compare register value are data corrected in accordance with the characteristics of the ultrasonic motor 3 that is actually to be controlled, and more accurate control can, therefore, be realized. Since the data storing unit 121 is stored in the flash memory 12, the correction D/A conversion set value and the correction compare register value are kept even after the microcomputer 1 is switched off. Accordingly, the setting means 122 can set more proper setting data by using the correction D/A conversion set value and the correction compare register value.

If the correction D/A conversion set value and the correction compare register value corresponding to the target rotation direction and the target rotation speed are not stored in the data storing unit 121 when the setting means 122 is to obtain the D/A conversion set value and the compare register value from the data storing unit 121, then the setting means 122 obtains the reference D/A conversion set value and the reference compare register value.

When the setting means 122 has set the D/A conversion set values and the compare register values, the setting means 122 outputs the values of the target rotation speeds and target rotation directions to the calculating means 123. In that occasion, the setting means 122 also outputs the setting frequencies and the setting amplitude values to the calculating means 123. Instead of the setting frequencies and the setting amplitude values, the setting means 122 may output the D/A conversion set values that have been set to the D/A conversion setting registers 1411, 1421 and the compare register values that have been set to the compare registers 1512, 1513, 1522 and 1523.

The calculating means 123 calculates the correction D/A conversion set value and the correction compare register value. The calculating means 123 may be a control program executed by the CPU 11. The calculating means 123 obtains the current rotation peed and the current rotation direction that have been output by the encoder 4 and stored in the up-down counter 17. The calculating means 123 also obtains the target rotation speed and the target rotation direction from the setting means 122. The calculating means 123 calculates a difference rotation speed based on the current rotation speed and the target rotation speed.

The calculating means 123 calculates a difference rotation direction based on the current rotation direction and the target rotation direction. The calculating means 123 calculates a corrected frequency (hereinafter, the "correction frequency") and the corrected amplitude value (hereinafter, the "correction amplitude value") that are required for obtaining the target rotation speed and the target rotation direction based on the difference rotation speed and the difference rotation direction. Further, the calculating means 123 calculates the correction D/A conversion set value and the correction compare register value that are required for obtaining the target rotation speed and the target rotation direction. The calculating means 123 stores the calculated correction D/A conversion set value and correction compare register value to the data storing unit 121 of the flash memory 12 in association with the target rotation speed and the target rotation direction, respectively. The calculation of the correction D/A conversion set value and the correction compare register value by the calculating means 123 is not limited to that described above.

The calculating means 123 compares the setting frequency with the correction frequency and the setting amplitude value with the correction amplitude value, respectively. When there is no difference between the setting amplitude value and the correction amplitude value and there is a difference between the setting frequency and the correction frequency, the calculating means 123 judges that the adjustment can be completed by correcting only the frequency. Conversely, when there are differences between the setting amplitude value and the correction amplitude value and between the setting frequency and the correction frequency, the calculating means 123 judges that both the frequency and the amplitude value need to be adjusted. The calculating means 123 informs the setting means 122 of the judgment result.

Next, when the CPU 11 is to execute the control program stored in the flash memory 12, it temporarily stores the control program in the RAM 13.

Next, the D/A converting unit 141 outputs the amplitude control signal based on the D/A conversion set value. The D/A converting unit 141 has the D/A conversion setting register 1411 and the D/A conversion 1412. The D/A conversion set value is written in the D/A conversion setting register 1411 by the setting means 122. The D/A conversion 1412 obtains the D/A conversion set value from the D/A conversion setting register 1411 and calculates the amplitude control signal having the amplitude value (voltage value) corresponding to the D/A conversion set value. When the microcomputer 1 is an eight bit microcomputer, for example, the D/A conversion 1412 calculates the amplitude value (voltage value) of the amplitude control signal by "the output voltage=the analog reference voltage×m/256". That is, if the analog reference voltage is 3.0 V and the D/A conversion set value set to the D/A conversion setting register 1411 is "00001111b (15 in decimal), the D/A conversion 1412 calculates "3.0×15/256≈0.18". In that case, the D/A conversion 1412 outputs the amplitude control signal with the amplitude of the voltage value "0.18 V" to the output circuit 1161. As such, the D/A conversion 1412 can change the amplitude value (voltage value) of the amplitude control signal based on the D/A conversion set value that has been set to the D/A conversion setting register 1411. The amplitude value (voltage value) of the amplitude control signal that is output by the D/A conversion 1412 is the amplitude of the control signal for the ultrasonic motor 3 that is output by the output circuit 161. The calculation of the voltage value by the D/A conversion 1412 is not limited to that described above.

The D/A converting unit 142 may be the same as the D/A converting unit 141. That is, the D/A conversion set value is written in the D/A conversion setting register 1421 by the setting means 122. The D/A conversion 1422 calculates the amplitude value (voltage value) by obtaining the D/A conversion set value from the D/A conversion setting register 1421 and outputs the amplitude control signal with the amplitude of the voltage value to the output circuit 162. The amplitude value (voltage value) of the amplitude control signal that is output by the D/A conversion 1422 is the amplitude of the control signal for the ultrasonic motor 3 that is output by the output circuit 162.

Next, the timer 151 outputs a pulse width modulation (PWM) signal based on the compare register value. The timer 151 has a counter 1511, the compare registers 1512 and 1513, and a control circuit 1514. The counter 1511 keeps counting on a certain cycle and outputs the count value. The compare register values are written in the compare registers 1512 and 1513 respectively by the setting means 122. Each of the compare registers 1512 and 1513 compares the register value set thereto with the count value that is output by the counter 1511.

When the compare register value set thereto matches the count value that is output by the counter 1511, each of the compare registers 1512 and 1513 outputs the signal to the counter 1511 and the control circuit 1514. The control circuit 1514 outputs the PWM signal based on the signal from the compare registers 1512 and 1513. The signal output from the compare register 1512 is the pulse width control signal to the control circuit 1514 (the output a in FIG. 2). The signal output from the compare register 1513 is the low level signal to the control circuit 1514 (the output b in FIG. 2). When the set value and the count value in the compare register 1512 match, the counter 1511 resets the count value.

After performing the count reset to make the count value reset to "0", the counter 1511 resumes the counting. That is, the counter 1511 repeats counting from the count "0" to the value which is the same as that set as the compare register value in the compare register 1512. When the pulse width control signal is input, the control circuit 1514 outputs a predetermined high voltage level (hereinafter, "H output"). On the other hand, when the low level signal is input, the control circuit 1514 outputs a predetermined low voltage level (hereinafter, "L output"). That is, after the pulse width control signal is input, the control circuit 1519 keeps the "H output" until the low level signal is input. As such, the control circuit 1519 determines the cycle and pulse width of the PWM signal according to the pulse width control signal from the compare register 1512 and the low level signal from the compare register 1513. Each of the compare registers 1512 and 1513 can change the output timing of the pulse width control signal and the low level signal by the compare register value set thereto.

As can be understood from the above, the compare register value set to the compare register 1512 and the compare register value set to the compare register 1513 are different from each other, and the adjustment needs to be performed on the values respectively. The actual voltage levels of the "H output" and the "L output" for the PWM signal are determined by the working voltage of the output circuit to which the PWM signal is input. For that reason, the voltage level for the PWM signal is nut particularly limited in the first exemplary embodiment. The cycle and pulse width of the PWM signal that is output by the control circuit 1514 make the frequency of the control signal of the ultrasonic motor 3 that is output by the output circuit 161.

The timer 152 may be the same as the timer 151. That is, the compare register value is written in the compare register 1522 by the setting means 122. When the compare register value and the count value in the counter 1521 match, the compare register 1522 outputs the pulse width control signal (the output c in FIG. 2) to the control circuit 1524. The compare register value is written in the compare register 1523 by the setting means 122. When the compare register value and the count value in the counter 1521 match, the compare register 1523 outputs the low level signal (the output d in FIG. 2) to the control circuit 1524. The control circuit 1524 outputs the PWM signal to the output circuit 162 based on the low level signal and the pulse width control signal. The cycle and pulse width of the PWM signal that is output by the control circuit 1524 make the frequency of the control signal of the ultrasonic motor 3 that is output by the output circuit 162.

Next, the output circuit 161 outputs the control signal for the ultrasonic motor 3 based on the PWM signal that is output by the control circuit 1514 and the amplitude control signal that is output by the D/A conversion 1412. FIG. 3 shows an example of the configuration of the output circuit 161. FIG. 3 shows an example of a case in which the output circuit 161 is configured by an Nch open drain.

In the output circuit of the FIG. 3, the output of the control circuit 1514 is connected with a gate electrode of the Nch open drain. The output of the D/A conversion 1412 is connected with the drain electrode of the Nch open drain via a pull-up resistor 8100 and makes the output to the transformer 2. A source electrode is grounded (hereinafter, "GND"). That is, it is configured that the PWM signal output by the control circuit 1514 plays the role of a switch for outputting the amplitude control signal from the D/A conversion 1412 to the transformer 2.

When the PWM signal from the control circuit 1514 is the "H output", the output circuit 161 has the switch turned on to be connected with the GND and the output to the transformer 2 becomes a low voltage level output (hereinafter, the "Lo output"). On the other hand, when the PWM output from the control circuit 1514 is the "L output", the output circuit 161 has the switch turned off and the amplitude value (voltage value) of the amplitude control signal of the D/A conversion 1412 becomes the output to the transformer 2.

With this configuration, the output circuit 161 is capable of outputting the control signal that has the frequency of the PWM signal and the voltage value of the amplitude control signal as the amplitude. Here, FIG. 3 is an example of the configuration of the output circuit 161, and the output circuit 161 may be configured to make the voltage value of the amplitude control signal as the amplitude of the control signal when the PWM signal is the "H output", and make the "Lo output" as the amplitude of the control signal when the PWM signal is the "L output". That case can also be addressed by the adjustment against the compare register values to be set to the compare registers 1512 and 1513.

The output circuit 162 may be the same as the output circuit 161. That is, the output circuit 162 outputs the control signal for the ultrasonic motor 3 based on the PWM signal that is output by the control circuit 1529 and the amplitude control signal that is output by the D/A conversion 1422.

The control signals that are output by the output circuit 161 and the output circuit 162 have a phase difference of 90 degrees. The phase difference between the control signals from the output circuit 161 and from the output circuit 162 are adjusted by adjusting the compare register values set to the compare registers 1512 and 1513, 1522 and 1523, respectively.

FIGS. 4A, 4B, and 4C show an example of relationships among the D/A converting unit 141, the timer 151, and the output circuit 161 in outputting the signals respectively. The axis of the ordinates shows the output states of the respective signals and the axis of the abscissas shows the passage of time. The counter 1511 counts between "000" and "FFF". To the compare registers 1512 and 1513, the values between "000" and "FFF" are set as the compare register values. Each of the compare registers 1512 and 1513 compares to see if the compare register value set thereto matches the count of the counter 1511.

First, at the time a when the set value to the compare register 1512 matches the count value, the counter 1511 resets the count value to "0". When the compare register value set matches the count value of the counter 1511, the compare register 1512 outputs the pulse control signal to the control circuit 1514. When the pulse width control signal is input from the compare register 1512, the control circuit 1514 outputs the PWM signal by the "H output". When the "H output" of the PWM signal is input, the output circuit 161 outputs the "Lo output" to the transformer 2 as the control signal.

Next, from the time a to the time b, the control circuit 1514 keeps the "H output" of the PWM signal. Accordingly, the output circuit 161 keeps outputting the "Lo output" to the transformer 2 as the control signal.

Next, at the time b when the compare register value set matches the count of the counter 1511, the compare register 1513 outputs the low level signal. When the low level signal is input, the control circuit 1514 makes the PWM signal as the "Lo output". When the PWM signal is input as the "L output", the output circuit 161 outputs the amplitude value (the voltage $\alpha$ in FIG. 4C) of the amplitude control signal from the D/A conversion 1412 to the transformer 2 as the control signal.

Next, from the time b to the time c, the control circuit 1514 keeps the "L output" of the PWM signal. Accordingly, the output circuit 161 keeps outputting the amplitude value (the voltage $\alpha$ in FIG. 4C) of the amplitude control signal from the D/A conversion 1112 to the transformer 2 as the control signal.

Next, at the time c when the set value to the compare register 1512 matches the count value, the counter 1511 resets the count value to "0". When the compare register value set matches the count value of the counter 1511, the compare register 1512 outputs the pulse control signal to the control circuit 1514. When the pulse width control signal is input from the compare register 1512, the control circuit 1514 outputs the PWM signal by the “H output”. When the “H output” of the PWM signal is input, the output circuit 161 outputs the “Lo output” to the transformer 2.

In that manner, the output circuit 161 can output the control signal that has the amplitude of the amplitude control signal of the D/A conversion 1412 from the time a to the time c as one cycle. Similarly, from the time c to the time e is taken as one cycle.

The relationships among the D/A converting unit 142, the timer 152, and the output circuit 162 in outputting the signals are the same as those described above. The control signals from the output circuit 161 and the output circuit 162 are output with a phase difference of 90 degrees. For that purpose, the compare registers 1512 and 1513 in the timer 151 and the compare registers 1522 and 1523 in the timer 152 achieve the phase difference by the compare register values set thereto.

Next, the up-down counter 17 receives inputs at the encoded current rotation direction and the encoded current rotation speed of the ultrasonic motor 3 from the encoder 4 and stores them.

Figure 5:
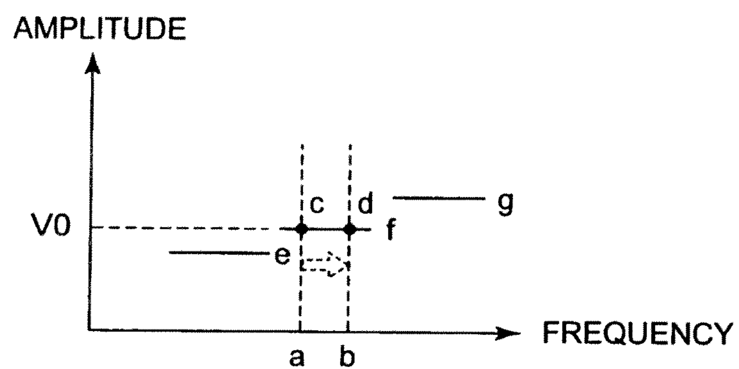
FIG. 5 is a diagram for describing correction of control signal characteristics for an ultrasonic motor 3.
Figure 6:
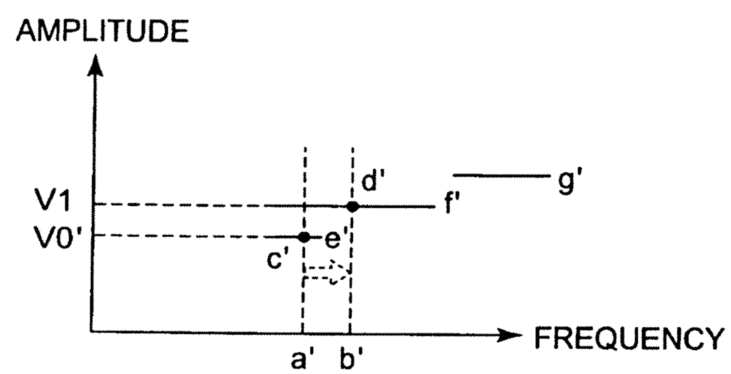
FIG. 6 is a diagram for describing the correction of the control signal characteristics for the ultrasonic motor 3.

Now, the control signal characteristics of the ultrasonic motor 3 and the correction of the control signal characteristics will be described with reference to FIG. 5 and FIG. 6. Each of FIG. 5 and FIG. 6 is a diagram for describing the correction of the control signal characteristics of the ultrasonic motor 3. In each graph of FIG. 5 and FIG. 6, the axis of the abscissas shows the frequency and the axis of the ordinates shows the amplitude.

The rotation speed of the ultrasonic motor 3 changes as the frequency of the control signal is changed. Specifically, the rotation speed of the ultrasonic motor 3 becomes faster as the frequency is decreased, and the rotation speed of the ultrasonic motor 3 becomes slower as the frequency is increased. The running torque of the ultrasonic motor 3 changes as the amplitude of the control signal is changed. Specifically, the running torque of the ultrasonic motor 3 becomes higher and the rotation speed becomes faster as the amplitude of the control signal is increased. On the other hand, the running torque of the ultrasonic motor 3 becomes lower and the rotation speed becomes slower as the amplitude of the control signal is decreased.

As described above, however, the characteristics vary for individual ultrasonic motors 3. That is why the ultrasonic motors 3 do not necessarily have the same rotation speed when they are driven by the control signal with the same amplitude and the same frequency. For that reason, if the current rotation speed and the current rotation direction do not match the target rotation speed and the target rotation direction respectively when the ultrasonic motor 3 is actually driven, then the characteristics of the control signal need to be corrected.

It is assumed that the setting frequency and the setting amplitude value V0 for the target rotation speed β are defined in the ultrasonic motor 3 having the characteristics shown in FIG. 5. This means that the ultrasonic motor 3 is capable of achieving the target rotation speed β when it is driven by the control signal with the frequency a and the amplitude value V0. Referring to FIG. 5, the target rotation speed β will be achieved by the control signal having the characteristics at the point c. The target rotation speed β cannot be actually achieved, however, because the characteristics differ among the individual ultrasonic motors 3.

Here, it is assumed that the calculating means 123 calculates the correction frequency b and the correction amplitude value V0 from the difference rotation speed and the difference rotation direction. This means that the target rotation speed β is obtained by the control signal having the characteristics at the point d. In that case, the characteristics of the control signal can be achieved by only (i.e., simply) changing the frequency of the control signal from the frequency a to the frequency b.

On the other hand, some characteristics cannot be achieved only by correcting the frequency. It is assumed that, in the ultrasonic motor having the characteristics shown in FIG. 6, the calculating means 133 calculates the correction frequency b and the correction amplitude value V1 from the difference rotation speed and the difference rotation direction. This means that the target rotation speed β is obtained by the control signal having the characteristics at the point d'. In that case, for the characteristics of the control signal, not only the frequency needs to be changed from the frequency a' to the frequency b' but also the amplitude value V0' needs to be changed to the amplitude value V1.

In the first exemplary embodiment, for the control signals that are output by the output circuits 161, 162, the frequencies can be changed by adjusting the compare register values to be set to the compare registers 1512, 1513, 1522 and 1523, and the amplitude can be changed by adjusting the D/A conversion set values to be set to the D/A conversion registers 1411, 1421. For that reason, the first exemplary embodiment is capable of adjusting the characteristics of the ultrasonic motor 3 in a wider scope than the case in which the characteristics of the ultrasonic motor 3 are adjusted only by the frequency of the control signal.

The configuration of the ultrasonic motor control device according to the first exemplary embodiment has been described above. With that configuration, the ultrasonic motor control device according to the first exemplary embodiment is capable of having each of the output circuits 161, 162 adjust the amplitude value and the frequency of the control signal based on the amplitude control signal that is output from each of the D/A converting units 141 and 142 based on each of the D/A conversion set values set by the setting means 122 and the PWM signal that is output from each of the timers 151 and 152 based on each of the compare register values set by the setting means 122.

The calculating means 123 calculates the differences between the current rotation speed and the target rotation speed and between the current rotation direction and the target rotation direction by obtaining the current rotation speed and the current rotation direction of the ultrasonic motor 3 that are stored in the up-down counter 17. To correct the characteristics of the control signal, the calculating means 123 calculates the correction frequency and the correction amplitude value. Further, the calculating means 123 calculates the correction compare register value for generating the correction frequency and the correction D/A conversion set value for generating the correction amplitude value and saves the values in the data storing unit 121. The setting means 122 sets the correction compare register values to the compare registers 1512, 1513, 1522 and 1523, and sets the correction D/A conversion set values to the D/A conversion setting registers 1411 and 1421. Since the output circuits 161 and 162 can output the control signals that have the correction frequency and the correction amplitude value, the ultrasonic motor 3 can achieve the target rotation speed and the target rotation direction. Therefore, even if the ultrasonic motor 3, which has been the control object, is replaced by another ultrasonic motor 3 of different characteristics due to exchange or the like, the microcomputer 1 can achieve the target rotation speed and the target rotation direction by adjusting the characteristics of the control signal.

Since the D/A conversion set value and the compare register value are saved in the flash memory 12, the correction compare register value and the correction D/A conversion set value are not lost even when the microcomputer 1 is switched off. Therefore, when the microcomputer 1 is switched on again, it can use the ultrasonic motor 3 by using the correction compare register value and the correction D/A conversion set value.

In addition, since the components of the microcomputer 1 are configured as the peripheral circuits of the microcomputer 1, they can reduce the power consumption much more than in the case in which the components are configured by using the fixed control circuit.

Further, the setting means 122 and calculating means 123 may be configured by hardware, instead of software (the control program)

[Description of Operating Method]

Figure 7:
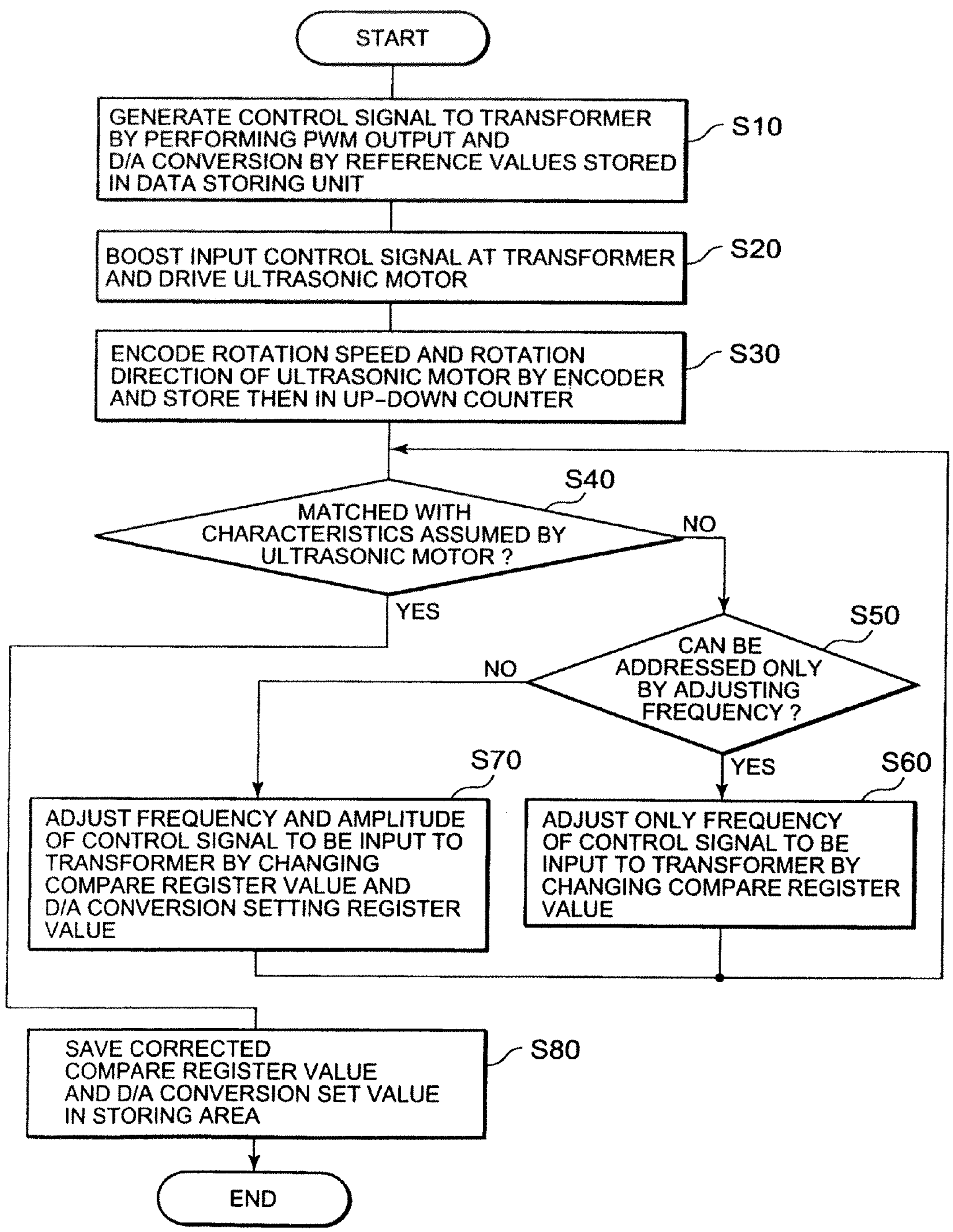
FIG. 7 is an operation flow of the ultrasonic motor control device according to the first exemplary embodiment.

Now, the operating method in the ultrasonic motor control device according to the first exemplary embodiment will be described with reference to FIG. 7. FIG. 7 shows the operation flow of the ultrasonic motor control device according to the first exemplary embodiment.

(step S10)

The setting means 122 receives the drive command for the ultrasonic motor 3 from outside. The setting means 122 determines the setting frequency and the setting amplitude value corresponding to the target rotation speed and the target rotation direction included in the drive command in the data storing unit 121 of the flash memory 12. The setting means 122 obtains the reference compare register value and the reference D/A conversion set value corresponding to the setting frequency and the setting amplitude value from the data storing unit 121 of the flash memory 12.

The setting means 122 writes the reference compare register values in the compare registers 1512, 1513, 1522 and 1523. The setting means 122 also writes the reference D/A conversion set value in the D/A conversion setting register. The timers 151 and 152 output the PWM signals based on the reference compare register values. The D/A converting units 141 and 192 output the amplitude control signals based on the reference D/A conversion set values. The output circuits 161, 162 output the control signals based on the PWM signal and the amplitude control signal.

(step S20)

The transformer 2 boosts the voltage of the control signal and outputs the boosted control signal to the ultrasonic motor 3. The ultrasonic motor 3 is driven as the control signal is input.

(step S30)

The encoder 4 obtains the current rotation speed and the current rotation direction of the ultrasonic motor 3. The encoder 4 encodes the current rotation speed and the current rotation direction and outputs them to the up-down counter 17. The up-down counter 17 stores the encoded current rotation speed and the current rotation direction.

(step S40)

The calculating means 123 obtains the current rotation speed and the current rotation direction that are stored in the up-down counter 17. The calculating means 123 also obtains the target rotation speed and the target rotation direction from the setting means 122. The calculating means 123 judges whether the target rotation speed matches the current rotation speed or not and whether the target rotation direction matches the current rot at ion direction or not. If it is judged that they match (i.e., a "Yes"), then the operation proceeds to step S80. On the other hand, if it is judged that they do not match (i.e., a "No"), then the operation proceeds to step S50.

(step S50)

If it is judged that they do not match, then the calculating means 123 calculates the difference rotation speed and the difference rotation direction. The calculating means 123 calculates the correction frequency and the correction amplitude value of the control signal for obtaining the target rotation speed and the target rotation direction based on the difference rotation speed and the difference rotation direction. The calculating means 123 also calculates the correction compare register value corresponding to the correction frequency and the correction D/A conversion set value corresponding to the correction amplitude value.

The calculating means 123 saves the correction frequency and the correction amplitude value in association with the target rotation speed and the target rotation direction as well as the compare register value in association with the correction frequency and the correction D/A conversion set value in association with the correction amplitude value correction, respectively, in the data storing unit 121 of the flash memory 12. The calculation of the correction compare register value and the correction D/A conversion set value by the calculating means 123 is not limited to that described above.

The calculating means 123 judges whether the correction for obtaining the target rotation speed and the target rotation direct ion can be addressed only by correcting the frequency or not. If it can be addressed only by correcting the frequency of the control signal (i.e., a "Yes" in step S50), then the operation proceeds to step S60. On the other hand, if it needs to correct the frequency and amplitude value of the control signal (i.e., a "No"), then the operation proceeds to step S70.

(step S60)

If it can be addressed only by correcting the frequency of the control signal (i.e., a "Yes" in step S50), then, the calculating means 123 informs the setting means 122 of the judgment result indicating that it can be addressed only by correcting the frequency. The setting means 122 obtains the correction compare register value corresponding to the target rotation speed and the target rotation direction from the data storing unit 121. The setting means 122 writes the correction compare register values in the compare registers 1512, 1513, 1522 and 1523. The timers 151 and 152 output the PWM signals based on the correction compare register values. The D/A converting units 141 and 142 output the amplitude control signals based on the D/A conversion set values that is currently set. The output circuits 161, 162 output the control signals based on the PWM signal and the amplitude control signal. Then, the operation returns to step S40.

(step S70)

If it needs to correct the frequency and amplitude value of the control signal (i.e., a "No" in step S50), the calculating means 123 informs the setting means 122 of the judgment result indicating that the frequency and amplitude value need to be corrected. The setting means 122 obtains the correction compare register value and the correction D/A conversion set value corresponding to the target rotation speed and the target rotation direction from the data storing unit 121. The setting means 122 writes the correction compare register values in the compare registers 1512, 1513, 1522 and 1523. The setting means 122 also writes the correction D/A conversion set value to the D/A conversion setting registers 1411 and 1421. The timers 151 and 152 output the PWM signals based on the correction compare register value. The D/A converting units 141 and 142 output the amplitude control signal based on the correction D/A conversion set values. The output circuits 161, 162 output the control signals based on the PWM signal and the amplitude control signal. Then, the operation returns to step S40.

(step S80)

When it is judged that the target rotation speed matches the current rotation speed and the target rotation direction matches the current rotation direction match, respectively (i.e., a "Yes" in step S40), the calculating means 123 saves the reference compare register value and the reference D/A conversion set value in the data storing unit 121 of the flash memory 12 as the correction compare register value and the correction D/A conversion set value. If the calculating means 123 has saved the correction compare register value and the correction D/A conversion set value in the data storing unit 121 at step S60 or step S70, it does not perform saving processing. Then, the setting means 122 performs setting by using the correction compare register value and the correction D/A conversion set value.

The operating method of the ultrasonic motor control device according to the first exemplary embodiment has been described above. As described above, the calculating means 123 calculates the differences between the current rotation speed and the target rotation speed and between the current rotation direction and the target rotation direction by obtaining the current rotation speed and the current rotation direction of the ultrasonic motor 3 that are stored in the up-down counter 17. To correct the characteristics of the control signal, the calculating means 123 calculates the correction frequency and the correction amplitude value.

Further, the calculating means 123 calculates the correction compare register value for generating the correction frequency and the correction D/A conversion set value for generating the correction amplitude value and saves the values in the data storing unit 121. The setting means 122 sets the correction compare register values to the compare registers 1512, 1513, 1522 and 1523, and sets the correction D/A conversion set values to the D/A conversion setting registers 1411 and 1921. Since the output circuits 161 and 162 can output the control signals that have the correction frequency and the correction amplitude value, the ultrasonic motor 3 can achieve the target rotation speed and the target rotation direction. Therefore, even if the ultrasonic motor 3, which has been the control object, is replaced by another ultrasonic motor 3 having different characteristics due to exchange or the like (e.g., manufacturing variations, etc.), the microcomputer 1 can achieve the target rotation speed and the target rotation direction by adjusting the characteristics of the control signal.

Since the D/A conversion set value and the compare register value are saved in the flash memory 12, the correction compare register value and the correction D/A conversion set value are not lost even when the microcomputer 1 is switched off. Therefore, when the microcomputer 1 is switched on again, it can use the ultrasonic motor 3 by using the correction compare register value and the correction D/A conversion set value.

Second Exemplary Embodiment

Now, the second exemplary embodiment will be described with reference to FIG. 8. FIG. 8 is a block diagram show in a configuration of the ultrasonic motor control device of the second exemplary embodiment. The ultrasonic motor control device of the second exemplary embodiment is configured somewhat similarly the ultrasonic motor control device in the first exemplary embodiment. Therefore, the description of the parts that are the same as those in the first exemplary embodiment will be omitted and the parts different from those in the first exemplary embodiment will be mainly described.

The ultrasonic motor control device of the second exemplary embodiment differs from that of the first exemplary embodiment in the D/A converting unit 143 of the microcomputer 1. In the first exemplary embodiment, the microcomputer 1 has the D/A converting unit 141 for outputting the amplitude control signal to the output circuit 161 and the D/A converting unit 142 for outputting the amplitude control signal to the output circuit 162.

In the second exemplary embodiment, the microcomputer 1 has only the D/A converting unit 143 for outputting the amplitude control signals to both of the output circuit 161 and the output circuit 162. The D/A converting unit 143 has the D/A conversion setting register 1431 and the D/A conversion 1432. The D/A conversion setting register 1431 may be the same as the D/A conversion setting registers 1411 and 1422. The D/A conversion 1432 may be the same as the D/A conversion 1412 and 1422. Therefore, the description functions of the D/A conversion setting register 1431 and the D/A conversion 1432 will be omitted.

The amplitude values of the control signals output by the output circuits 161, 162 usually have the same voltage level. By taking advantage of that point, in the second exemplary embodiment the D/A conversion 1432 outputs the amplitude control signal to both of the output circuit 161 and the output circuit 162. Therefore, the amplitude values of the control signals output by the output circuits 161, 162 have the same value.

Accordingly, the power consumption of the microcomputer 1 can be reduced and an effect of reducing heat in the structure can be achieved.

The present invention has thus been described. According to the present invention, the microcomputer 1 can adjust the frequency and amplitude of the control signal for the ultrasonic motor 3 by adjusting the D/A conversion set values to be set to the D/A conversion setting registers 1911, 1421 and 1431 and the compare register values to be set to the compare registers 1512, 1513, 1522 and 1523. Accordingly, adjusting the characteristics of the ultrasonic motor 3 can be widely performed so that the ultrasonic motor 3 can be controlled by absorbing the change in the characteristics due to the exchange, manufacturing variations, service life deterioration or the like of the ultrasonic motor 3.

Since the D/A conversion set value and the compare register value that are required for adjusting the control signal, are saved in the flash memory 12, the correction compare register value and the correction D/A conversion set value are not lost even when the microcomputer 1 is switched off. Therefore, when the microcomputer 1 is switched on again, it can use the ultrasonic motor 3 by using the correction compare register value and the correction D/A conversion set value.

In addition, since the components of the microcomputer 1 are configured as the peripheral circuits of the microcomputer 1, they can reduce the power consumption much more than in the case in which the components are configured by using the fixed control circuit.

Figure 9:
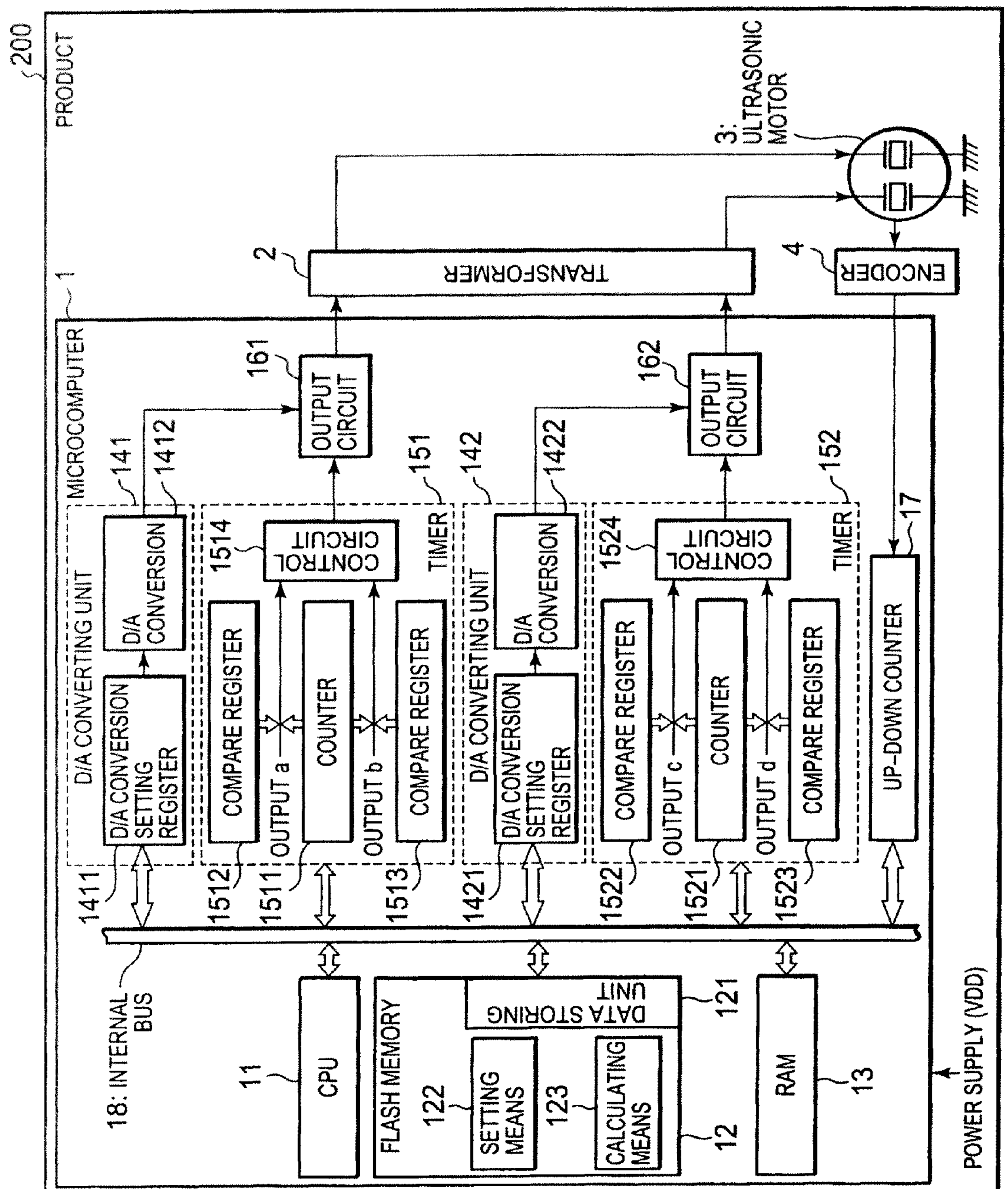
FIG. 9 is a block diagram showing an example of installing the ultrasonic motor control device of the invention in a product 200.

Furthermore, as shown in FIG. 9, the ultrasonic motor control device may be installed in various products (a product 200 in FIG. 9), for example, cameras, vehicles, etc. with great benefit.

Although the invention has been described above in connection with several exemplary embodiments thereof, it will be appreciated by those skilled in the art that those exemplary embodiments is provided solely for illustrating the invention, and should not be relied upon to construe the appended claims in a limiting sense.

Further, it is noted that, notwithstanding any claim amendments made hereafter, applicant's intent is to encompass equivalents all claim elements, even if amended later during prosecution.

What is claimed is:

1. A microcomputer that outputs a pulse signal controlling an ultrasonic motor, the microcomputer comprising:

a digital/analog, D/A, conversion set register that stores a D/A conversion set value setting an amplitude value of the pulse signal;

a D/A converter that generates the amplitude value based on the D/A conversion set value;

a first compare register that stores a first compare register value setting a frequency of the pulse signal;

a second compare register that stores a second compare register value setting a duty ratio of the pulse signal;

a counter that outputs a count value;

a first comparator that compares the first compare register value with the count value to generate a first comparison result signal;

a second comparator that compares the second compare register value with the count value to generate a second comparison result signal; and an output circuit that generates the pulse signal based on the amplitude value, the first comparison result signal and the second comparison result signal.

2. The microcomputer according to claim 1, further comprising:

a central processing unit, CPU, that is coupled to the D/A conversion set register, the first compare register and the second compare register, wherein the CPU monitors a rotation speed of the ultrasonic motor that is driven in response to the pulse signal that is generated based on the D/A conversion set value, the first compare register value and the second compare register value, and corrects, based on a monitoring result, at least one of the D/A conversion set value, the first compare register value and the second compare register value.

3. The microcomputer according to claim 2, wherein the microcomputer is coupled to an encoder that obtains a current rotation speed of the ultrasonic motor, and further comprises:

an up-down counter that is coupled between the CPU and the encoder, and that receives information of the current rotation speed of the ultrasonic motor, and wherein the CPU monitors the rotation speed of the ultrasonic motor by the information.

4. The microcomputer according to claim 1, further comprising:

a storage unit that stores the D/A conversion set value, the first compare register value and the second compare register value, wherein the D/A conversion set value allows for determining the amplitude value of the pulse signal corresponding to a target rotation speed that is targeted by the ultrasonic motor, wherein the first compare register value allows for determining the frequency of the pulse signal corresponding to the target rotation speed that is targeted by the ultrasonic motor, and wherein the second compare register value allows for determining the duty ratio of the pulse signal corresponding to the target rotation speed that is targeted by the ultrasonic motor.

5. The microcomputer according to claim 1, wherein the microcomputer respectively comprises the D/A conversion set register, the D/A converter, the first compare register, the second compare register, the counter, the first comparator, the second comparator, and the output circuit in a number corresponding to a number of piezoelectric bodies in the ultrasonic motor.

6. The microcomputer according to claim 1, wherein the microcomputer respectively comprises the first compare register, the second compare register, the counter, the first comparator, the second comparator, and the output circuit in a number corresponding to a number of piezoelectric bodies in the ultrasonic motor, and wherein the D/A conversion set register and the D/A converter are shared.

7. A product comprising:

the microcomputer according to claim 1; and the ultrasonic motor that is coupled to the microcomputer.

8. A product comprising:

the microcomputer according to claim 3;

the ultrasonic motor that is coupled to the microcomputer; and the encoder that is coupled between the microcomputer and the ultrasonic motor.

* * * * *